US009712282B2

(12) United States Patent
Patil et al.

(10) Patent No.: US 9,712,282 B2
(45) Date of Patent: Jul. 18, 2017

(54) ROUTE-LESS MULTI-HOP TRANSMISSION TECHNIQUE IN A PEER-TO-PEER INFRASTRUCTURE-LESS NETWORK

(71) Applicant: QUALCOMM Incorporated, San Diego, CA (US)

(72) Inventors: Abhishek Pramod Patil, San Diego, CA (US); Alireza Raissinia, Monte Sereno, CA (US); Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/667,456

(22) Filed: Mar. 24, 2015

(65) Prior Publication Data

US 2015/0280866 A1    Oct. 1, 2015

Related U.S. Application Data

(60) Provisional application No. 61/971,872, filed on Mar. 28, 2014.

(51) Int. Cl.
| | |
|---|---|
| *H04L 1/08* | (2006.01) |
| *H04L 12/18* | (2006.01) |
| *H04L 29/08* | (2006.01) |
| *H04W 40/02* | (2009.01) |
| *H04W 40/24* | (2009.01) |

(Continued)

(52) U.S. Cl.
CPC .............. *H04L 1/08* (2013.01); *H04L 12/189* (2013.01); *H04L 67/104* (2013.01); *H04W 40/023* (2013.01); *H04W 40/24* (2013.01); *H04W 40/08* (2013.01); *H04W 84/18* (2013.01)

(58) Field of Classification Search
CPC ..... H04W 40/02; H04W 40/04; H04W 40/08; H04W 40/12; H04W 40/125; H04W 40/16

See application file for complete search history.

(56) References Cited

U.S. PATENT DOCUMENTS

| | | |
|---|---|---|
| 2004/0095920 A1 | 5/2004 | Lippman et al. |
| 2006/0178156 A1 | 8/2006 | Kim |

(Continued)

FOREIGN PATENT DOCUMENTS

| | | |
|---|---|---|
| EP | 2178064 A1 | 4/2010 |
| WO | 2013093670 A1 | 6/2013 |

OTHER PUBLICATIONS

Hiertz G.R., et al., "IEEE 802.11s: The WLAN Mesh Standard", IEEE Wireless Communications, IEEE Service Center, Piscataway, NJ, US, vol. 17, No. 1, Feb. 1, 2010, pp. 104 through111.

(Continued)

*Primary Examiner* — Feben M Haile
(74) *Attorney, Agent, or Firm* — Toler Law Group

(57) ABSTRACT

A method includes receiving, at a first station of a peer-to-peer infrastructure-less network, a data packet transmitted from a second station of the peer-to-peer infrastructure-less network. The method also includes determining whether to retransmit the data packet to at least one other station in the peer-to-peer infrastructure-less network or whether to suppress retransmission of the data packet based on received signal strengths of received retransmissions of the same data packets from one or more nearby stations.

14 Claims, 7 Drawing Sheets

(51) Int. Cl.
　　　*H04W 84/18*　　　(2009.01)
　　　*H04W 40/08*　　　(2009.01)

(56) References Cited

U.S. PATENT DOCUMENTS

| | | |
|---|---|---|
| 2010/0304759 A1 | 12/2010 | Leppanen et al. |
| 2011/0026500 A1 | 2/2011 | Shaffer et al. |
| 2012/0134280 A1* | 5/2012 | Rotvold .............. H04B 17/24 370/252 |
| 2013/0039297 A1* | 2/2013 | Wang .............. H04W 76/045 370/329 |
| 2014/0016643 A1* | 1/2014 | Vasseur .............. H04L 45/24 370/392 |

OTHER PUBLICATIONS

International Search Report and Written Opinion—PCT/US2015/022511—ISA/EPO—Sep. 30, 2015.
Khan F., et al., "Towards Guaranteed Delivery of Safety Messages in VANETs", Global Communications Conference (GLOBECOM), IEEE, Dec. 3, 2012, pp. 207 through 213.
Yeh C-H., "ROAD: A Variable-Radius MAC Protocol for Ad Hoc Wireless Networks", VTC Spring 2002, Proceedings of IEEE 55th Vehicular Technology Conference, Birmingham, AL, vol. 1, May 6 through 9, 2002, pp. 399 through 403.
Zhu T., et al., "Exploring Link Correlation for Efficient Flooding in Wireless Sensor Networks", USENIX, Mar. 18, 2010, pp. 1 through 15.
Partial International Search Report—PCT/US2015/022511—ISA/EPO—Jul. 1, 2015.

\* cited by examiner

ROUTE-LESS MULTI-HOP TRANSMISSION TECHNIQUE IN A PEER-TO-PEER INFRASTRUCTURE-LESS NETWORK

I. CLAIM OF PRIORITY

The present application claims priority from U.S. Provisional Patent Application No. 61/971,872 entitled "ROUTE-LESS MULTI-HOP TRANSMISSION TECHNIQUE IN A WIRELESS MESH NETWORK," filed Mar. 28, 2014, the contents of which are incorporated by reference in their entirety

II. FIELD

The present disclosure is generally related to a route-less multi-hop transmission technique.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A peer-to-peer infrastructure-less network may be formed by wireless telephones and other wireless devices to communicate data between the wireless devices without management by a central node (e.g., access point) or server. As a non-limiting example, the Institute of Electrical and Electronics Engineers (IEEE) 802.11s is a specification that defines a standardized set of wireless mesh network communication protocols. In 802.11s, stations (e.g., wireless devices) in a wireless mesh network may receive data packets (e.g., messages) addressed to multiple stations, such as multicast messages and broadcast messages. In order to propagate a data packet throughout the wireless mesh network, each station receives and transmits (e.g., forwards) the data packet to one or more neighboring stations (e.g., stations within a one-hop range). Forwarding messages at each station adds traffic and overhead to the wireless mesh network.

IV. SUMMARY

The present disclosure is directed to systems and methods that reduce overhead in a peer-to-peer infrastructure-less network. Examples of peer-to-peer infrastructure-less networks may include wireless mesh networks and neighbor awareness networking (NAN) data link networks. Instead of each station transmitting (e.g., forwarding) a received data packet upon reception, each station determines whether to forward the received data packet based on a received signal strength of at least one data packet received from neighboring stations. For example, a source of a data packet (e.g., a source station) transmits the data packet to one or more neighboring stations of the source station, such as one or more stations within a one-hop range of the source station. When a first station receives the data packet from the source station, the first station may buffer the data packet and initiate a countdown sequence, during which the first station may detect retransmitted (e.g., forwarded) data packets from neighboring stations. For example, neighboring stations that received the data packet from the source station may retransmit (e.g., forward) the data packet to one or more stations, including the first station. After the countdown sequence has completed (or during the countdown sequence), the first station may determine (e.g., measure) the received signal strength of each received retransmitted data packet to determine the proximity of each forwarding neighbor station. For example, a forwarded data packet received by the first station at a high received signal strength may indicate that the neighbor station that forwarded the data packet is in a relatively close proximity to the first station. Alternatively, a forwarded data packet received by the first station at a low received signal strength may indicate that the neighboring station that forwarded the data packet is relatively further away from the first station.

In response to a determination that the received signal strength of a forwarded data packet is high (e.g., surpasses a first threshold corresponding to a relatively large received signal strength indicator (RSSI)), the first station may suppress retransmission of the data packet after the countdown sequence has completed. For example, there is a high probability that stations within a one-hop range (e.g., a transmission range) of the first station have already received the data packet from the neighboring station that forwarded the data packet to the first station. Additionally, in response to a determination that the received signal strengths of three or more forwarded data packets (from three or more corresponding neighboring stations) each surpass a second threshold (e.g., a mid-range RSSI) that is lower than the first threshold, the first station may suppress retransmission of the data packet after the countdown sequence has completed. For example, for two-dimensional (2-D) spaces, the first station may determine that it is within a triangle formed by the three or more neighboring stations and that there is a high probability that stations within the one-hop range of the first station have already received the data packet from the three or more neighboring stations that forwarded the data packets to the first station.

In addition, in response to a determination that the received signal strengths of four or more forwarded data packets (from four or more corresponding neighboring stations) each surpass the second threshold (e.g., a mid-range RSSI) that is lower than the first threshold, the first station may suppress retransmission of the data packet after the countdown sequence has completed. For example, for three-dimensional (3-D) spaces, the first station may determine that it is within a three-dimensional polygon formed by the four or more neighboring stations and that there is a high probability that stations within the one-hop range of the first station have already received the data packet from the four or more neighboring stations that forwarded the data packets to the first station. Suppressing retransmission of the data packet, at the first station, may reduce overhead (e.g., traffic) in the peer-to-peer infrastructure-less network.

The present disclosure also describes a negative acknowledge (NAK) based approach to improve content delivery reliability of data packets in a peer-to-peer infrastructure-less network. For example, after suppressing transmission of a data packet, a first station may transmit a NAK request to each station in the one-hop range of the first station. In response to a particular station transmitting a NAK to the first station (e.g., indicating that the particular station has not received the data packet), the first station may transmit (e.g., forward) the data packet to the particular station.

In a particular embodiment, a method includes receiving, at a first station of a peer-to-peer infrastructure-less network, a data packet transmitted from a second station of the peer-to-peer infrastructure-less network. The method also includes determining whether to retransmit the data packet to at least one other station in the peer-to-peer infrastructure-less network or whether to suppress retransmission of the data packet.

In another particular embodiment, an apparatus includes a processor and a memory coupled to the processor. The memory stores instructions that are executable by the processor to perform operations. The operations include receiving, at a first station of a peer-to-peer infrastructure-less network, a data packet transmitted from a second station of the peer-to-peer infrastructure-less network. The operations also include determining whether to retransmit the data packet to at least one other station in the peer-to-peer infrastructure-less network or whether to suppress retransmission of the data packet.

In another particular embodiment, a non-transitory computer-readable medium includes instructions that, when executed by a processor, cause the processor to receive, at a first station of a peer-to-peer infrastructure-less network, a data packet transmitted from a second station of the peer-to-peer infrastructure-less network. The instructions are also executable to cause the processor to determine whether to retransmit the data packet to at least one other station in the peer-to-peer infrastructure-less network or whether to suppress retransmission of the data packet.

In another particular embodiment, an apparatus includes means for receiving a data packet transmitted from a station of a peer-to-peer infrastructure-less network. The apparatus also includes means for determining whether to retransmit the data packet to at least one other station in a peer-to-peer infrastructure-less network or whether to suppress retransmission of the data packet.

One advantage provided by at least one of the disclosed embodiments is overhead and traffic reduction in a peer-to-peer infrastructure-less network (e.g., a neighborhood awareness networking (NAN) data link network or a wireless mesh network that operates in accordance with the IEEE 802.11s standard). For example, suppressing retransmission of data packets may reduce the likelihood of redundant transmissions. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular embodiments of the present disclosure are described below with reference to the drawings. In the description, common features are designated by common reference numbers throughout the drawings.

Figure 1A:
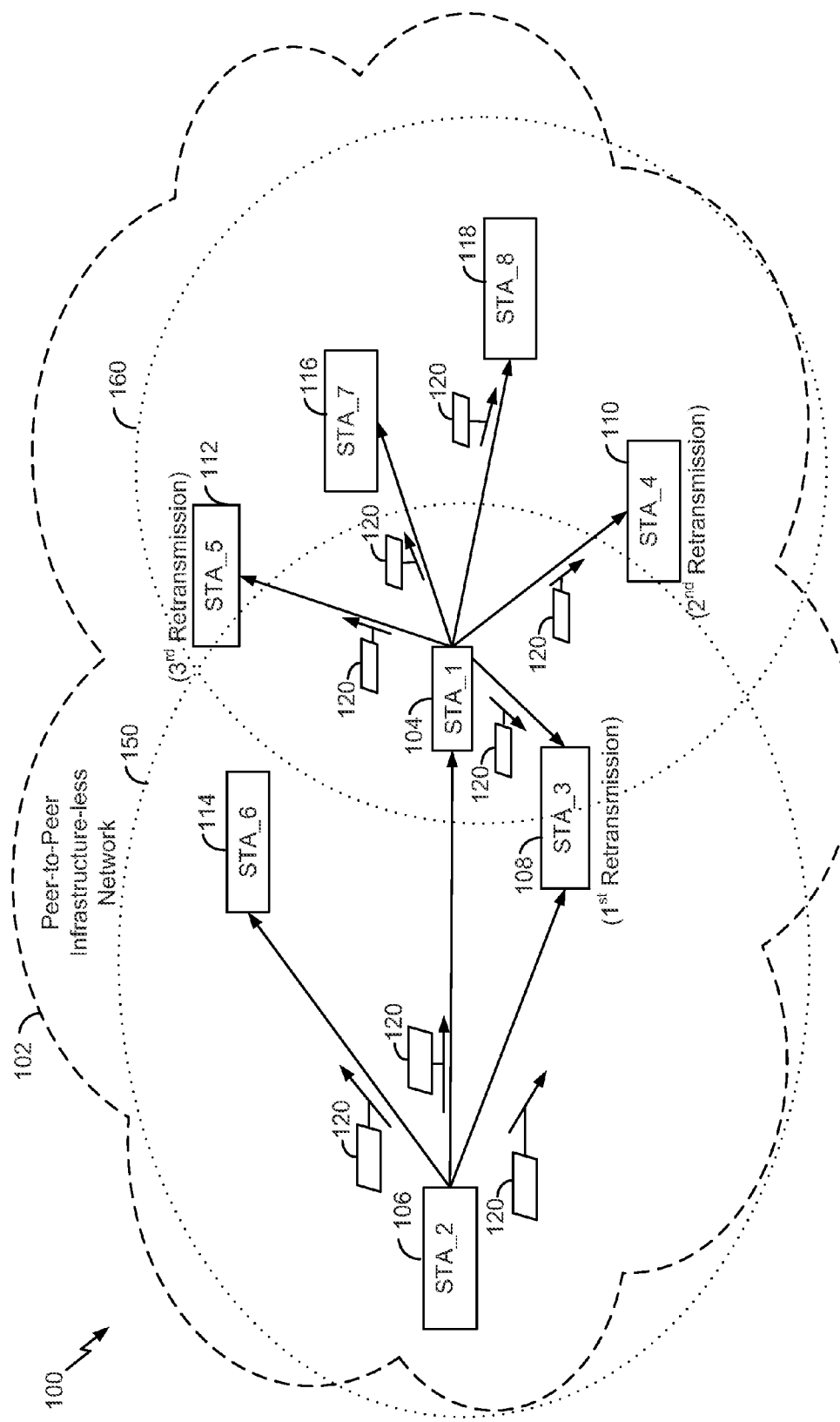
FIGS. 1A-1B are diagrams of a particular embodiment of a system that includes a peer-to-peer infrastructure-less network that supports route-less multi-hop transmission techniques.
Figure 1B:
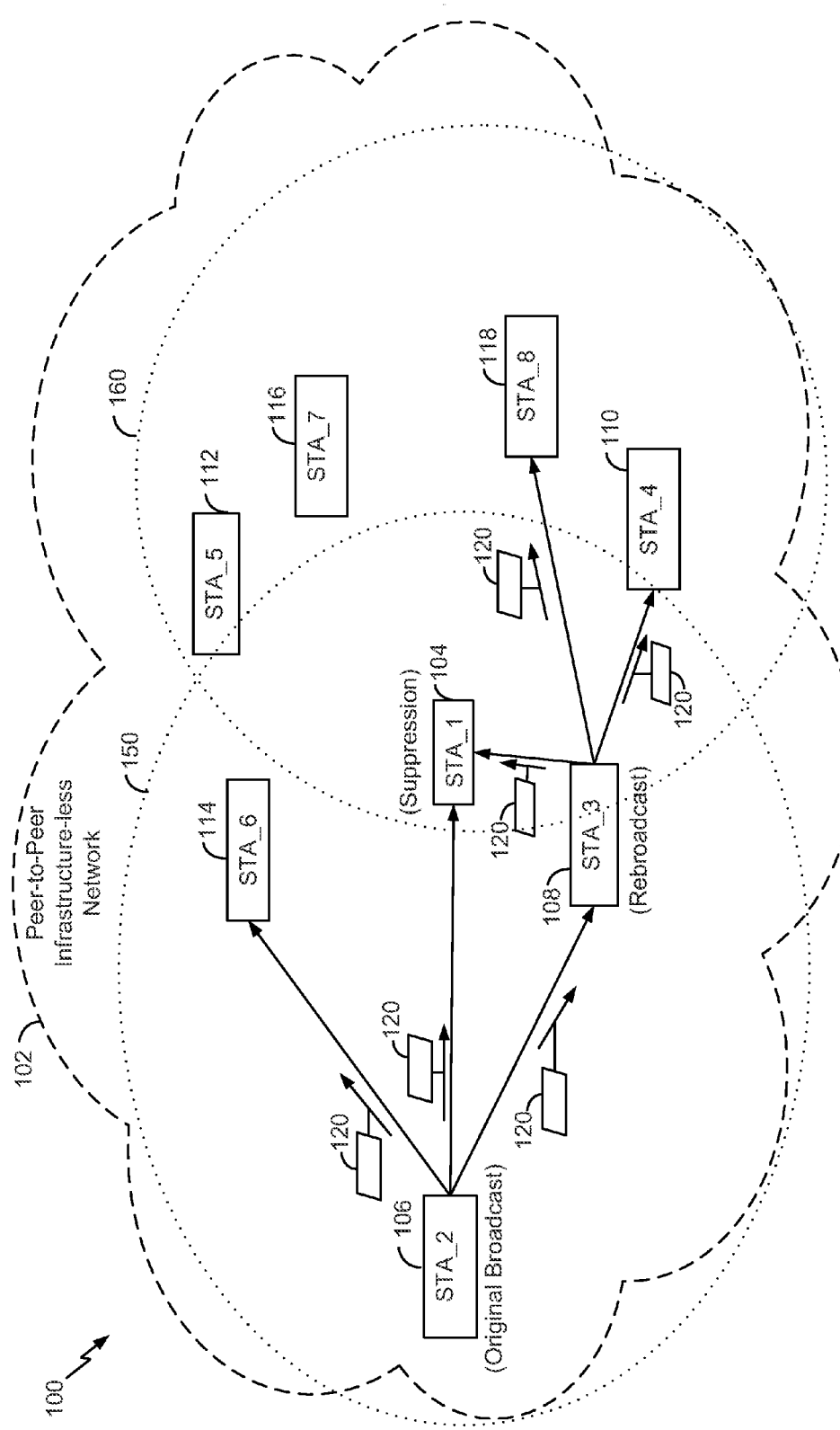

Referring to FIGS. 1A-1B, a particular embodiment of a system 100 that includes a peer-to-peer infrastructure-less network that supports route-less multi-hop transmission techniques is shown. The system 100 includes a peer-to-peer infrastructure-less network 102 including a first station (STA_1) 104, a second station (STA_2) 106, a third station (STA_3) 108, a fourth station (STA_4) 110, a fifth station (STA_5) 112, a sixth station (STA_6) 114, a seventh station (STA_7) 116, and an eighth station (STA_8) 118.

Each of the stations 104-118 may enter and leave the peer-to-peer infrastructure-less network 102. In a particular embodiment, the peer-to-peer infrastructure-less network 102 may be a social wireless mesh network. For example, the peer-to-peer infrastructure-less network 102 may operate in accordance with one or more standards, such as an Institute of Electrical and Electronics Engineers (IEEE) 802.11 standard. In another particular embodiment, the peer-to-peer infrastructure-less network 102 may be a neighborhood awareness networking (NAN) data link network. Unless otherwise indicated, the peer-to-peer infrastructure-less network 102 described below may support transmissions according to the IEEE 802.11s standard. However, the description with respect to the IEEE 802.11s standard is not intended to be limiting and is provided as a non-limiting illustrative example. For example, similar techniques may be applied in embodiments where the peer-to-peer infrastructure-less network is a NAN data link network.

Each of the stations 104-118 may be a wireless communication device configured to transmit data and/or receive data from one or more other wireless communication devices in the peer-to-peer infrastructure-less network 102. For example, the stations 104-118 may include a processor (e.g., a central processing unit (CPU), a digital signal processor (DSP), a network processing unit (NPU), etc.), a memory (e.g., a random access memory (RAM), a read-only memory (ROM), etc.), and/or a wireless interface configured to send and receive data via a peer-to-peer infrastructure-less network, as described further with reference to FIG. 5. Each of the stations 104-118 may be configured to act in accordance with the IEEE 802.11s standard, as a non-limiting example.

The second station 106 may be configured to generate a data packet 120 (e.g., a message) addressed to multiple stations of the peer-to-peer infrastructure-less network 102. In a particular embodiment, the data packet 120 may be a broadcast message (e.g., may be addressed to each other station in the peer-to-peer infrastructure-less network 102). In other embodiments, the data packet 120 may be a multicast message (e.g., may be addressed to a subset of the other stations in the peer-to-peer infrastructure-less network 102). As a non-limiting example, the data packet 120 may be addressed to the first station 104, the third station 108, and the eighth station 118. In other embodiments, the data packet 120 may be a unicast message (e.g., may be addressed to one other station in the peer-to-peer infrastructure-less network 102). As a non-limiting example, the data packet 118 may be addressed to the eighth station 118. Unless otherwise noted, transmissions and retransmissions according to the disclosure may correspond to broadcasts. However, it will be appreciated that the disclosed techniques may also apply to multicast and unicast. Further, although particular operation(s) may be described as being performed by particular station(s), it should be noted that each station 104-118 may be capable of performing the various described operations.

The second station 106 may be configured to transmit the data packet 120 to stations in the peer-to-peer infrastructure-less network 102. For example, the second station 106 may be configured to broadcast the data packet 120 to each other station in the peer-to-peer infrastructure-less network 102. In the illustrated embodiment, transmissions (e.g., broadcasts) by the second station 106 may be received by stations within a one-hop range 150 of the second station 106. For example, in the illustrated embodiment, the first station 104, the third station 108, the fourth station 110, the fifth station 112, and the sixth station 114 are within the one-hop range 150 of the second station 106. Thus, the first station 104, the third station 108, the fourth station 110, the fifth station 112, and the sixth station 114 may receive the data packet 120 from the second station 106. In a particular embodiment, the one-hop range 150 may be substantially spherical and may be centered at the second station 106.

In the illustrated embodiment, the seventh station 116 and the eighth station 118 are located outside the one-hop range 150 of the second station 106. Thus, the seventh and eighth stations 116, 118 may not receive the data packet 120 from the second station 106. A station in range of (e.g., within one hop) the seventh and eighth stations 116, 118 may retransmit (e.g., forward) the data packet 120 to the seventh and eighth stations 116, 118. As a non-limiting example, the first station 104 may have a one-hop range 160 that includes the third station 108, the fourth station 110, the fifth station 112, the seventh station 116, and the eighth station 118. In response to receiving the data packet 120 from the second station 106, the first station 104 may retransmit (e.g., forward) the data packet 120. For example, the first station 104 may rebroadcast the data packet 120 such that stations within the one-hop range 160 of the first station 104 (e.g., the third station 108, the fourth station 110, the fifth station 112, the seventh station 116, and the eighth station 118) receive the rebroadcasted data packet 120.

Because the seventh and eighth stations 116, 118 may be within a one-hop range of multiple stations, multiple stations may retransmit the data packet 120 in an effort to ensure that the seventh and eighth stations 116, 118 receive the data packet 120. However, such unconditional retransmission may be inefficient. In order to reduce overhead of the peer-to-peer infrastructure-less network 102, one or more stations may determine whether to retransmit the data packet 120 or suppress retransmission of the data packet 120. For example, upon receiving the data packet 120 from the second station 106, the first station 104 may determine whether to rebroadcast the data packet 120 to the stations in the one-hop range 160 of the first station 104 (as illustrated in FIG. 1A) or suppress the rebroadcast of the data packet 120 (as illustrated in FIG. 1B). The determination may be based on a likelihood that each station in the one-hop range 160 of the first station 104 has (e.g., previously) received the data packet 120. For example, if there is a high probability that each station in the one-hop range 160 of the first station 104 has previously received the data packet 120, the first station 104 may suppress retransmission of the data packet 120 to reduce overhead of the peer-to-peer infrastructure-less network 102 (e.g., reduce the amount of traffic in the peer-to-peer infrastructure-less network 102) as shown in FIG. 1B. If there is a low probability that at least one station in the one-hop range 160 of the first station 104 has previously received the data packet 120, the first station 104 may retransmit the data packet 120 to the at least one station.

For example, in response to receiving the data packet 120 from the second station 106, the first station 104 may be configured to buffer the data packet 120. After buffering the data packet 120, the first station 104 may initiate a countdown sequence from a particular number. The particular number may be a random number that is defined by an industry standard (e.g., an IEEE 802.11 standard) or may be a random number generated by a component of the first station 104 (e.g., a pseudo-random number generator). As a non-limiting example, the first station 104 may initiate a countdown sequence that lasts approximately 5 microseconds (μs). Once the countdown sequence is completed (e.g., reaches zero), the first station 104 may determine whether to retransmit the data packet 120 or whether to suppress the retransmission of the data packet 120.

For example, the first station 104 may determine whether a station within a "relatively close" proximity has retransmitted (e.g., rebroadcast) the data packet 120 during the countdown sequence. In response to a determination that a station within a relatively close proximity has retransmitted the data packet 120 during the countdown sequence, the first station 104 may suppress retransmission of the data packet 120, as shown in FIG. 1B. For example, the third station 108 may retransmit (e.g., rebroadcast) the data packet 120 (e.g., a first retransmission) during the countdown sequence of the first station 104. The first station 104 may detect the first retransmission of the data packet 120 from the third station 108 (e.g., receive the retransmitted data packet 120) and may determine (e.g., measure) a received signal strength of the first retransmission. For example, the first station 104 may determine a proximity of the third station 108 based on a received signal strength indicator (RSSI) associated with the retransmitted data packet 120. A relatively high RSSI may indicate that the third station 108 is in close proximity to the first station 104, and a relatively low RSSI may indicate that the third station 108 is not in close proximity to the first station 104.

Figure 6:
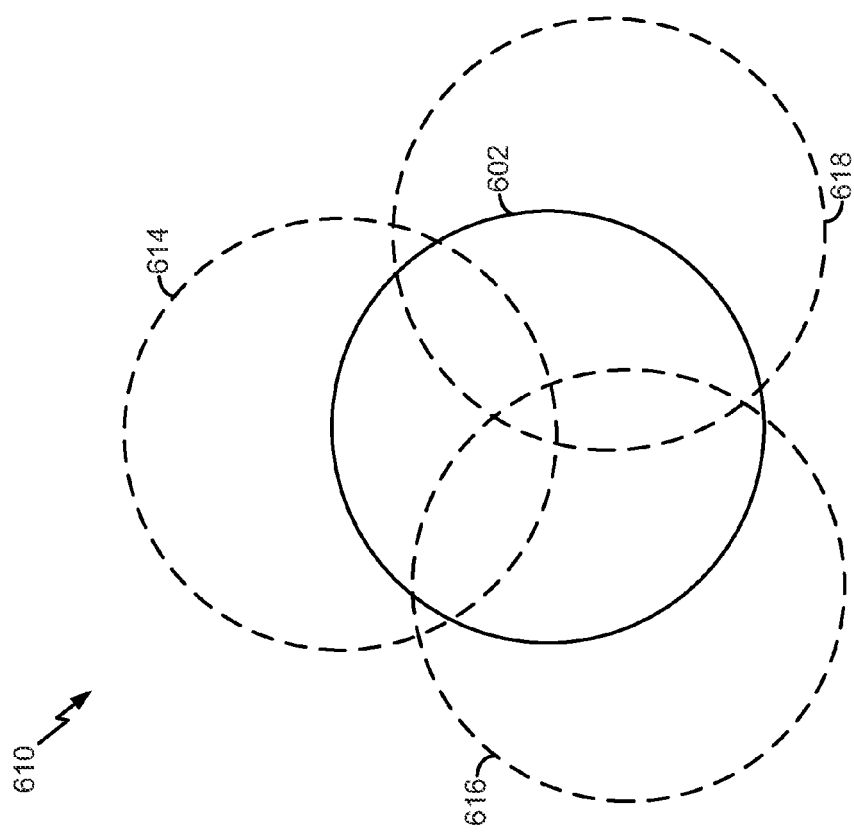
FIG. 6 is a diagram of embodiments depicting overlapping coverage areas.
Figure 6:
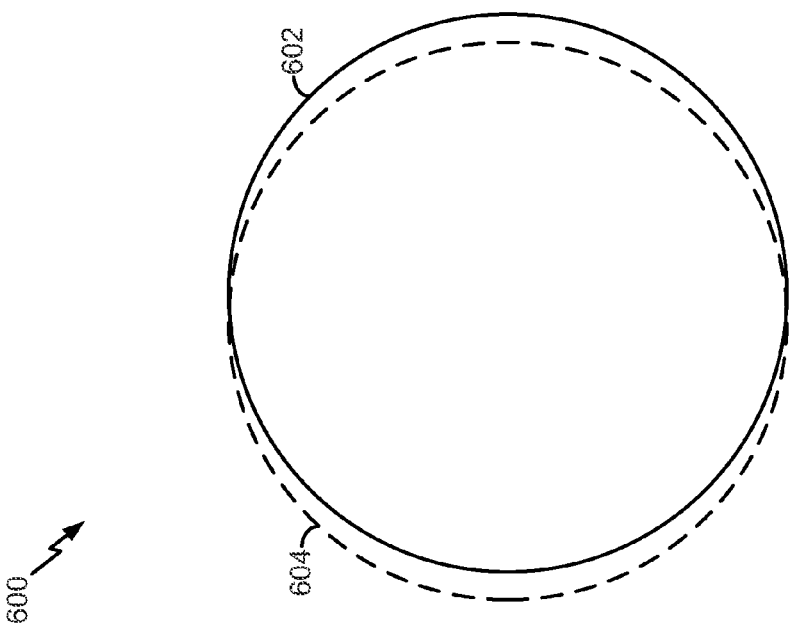

In response to a determination that the received signal strength of the first retransmission satisfies a first threshold (e.g., is greater than or equal to a first threshold signal strength or has a relatively high RSSI), the first station 104 may suppress retransmission of the data packet 120, as shown in FIG. 1B. For example, the first station 104 may determine that the third station's 108 coverage area (e.g., a one-hop range of the third station 108) is substantially similar to (e.g., substantially overlaps) the one-hop range 160 of the first station 104 when the received signal strength satisfies the first threshold. An example of such substantially overlapping coverage areas is illustrated in a first embodiment 600 of FIG. 6. A coverage area 602 of the first station 104 may substantially overlap a coverage area 604 of the third station 108. Thus, the first station 104 may suppress retransmission of the data packet 120 because of a high probability stations that would receive a retransmission of the data packet 120 from the first station 104 have already received the first retransmission from the third station 108. For example, the seventh and eighth stations 116, 118 may have a high probability of receiving the retransmission of the data packet 120 from the third station 108.

The first threshold may correspond to suppression range (e.g., a maximum range between the first station 104 and the third station 108 that results in the first station 104 suppressing retransmission of the data packet 120). For example, the suppression range increases as the first threshold decreases. In a particular embodiment, the suppression range may be preprogrammed into each station 104-118 according to an industry standard, such as an IEEE 802.11 standard. A short suppression range may improve reliability by increasing the number of broadcasters each station may hear. However, a short suppression range may also increase overhead (e.g., generate a relatively large amount of redundant traffic in the peer-to-peer infrastructure-less network 102) and increase broadcast contention. Accordingly, each station 104-118 may utilize a negative acknowledgment (NAK) based approached in addition to selecting a reasonable suppression range, as further described with respect to FIG. 2.

In a particular embodiment, the first station 104 may determine whether a particular number of stations (e.g., three or more stations) within a "relatively close" proximity have retransmitted (e.g., rebroadcast) the data packet 120 during the countdown sequence. For example, the third station 108, the fourth station 110, and the fifth station 112 may each retransmit the data packet 120 during the countdown sequence of the first station 104. The first station 104 may detect the first retransmission by the third station 108, the second retransmission by the fourth station 110, and the third retransmission by the fifth station 112 (e.g., may receive a retransmitted data packet 120 from the third, fourth, and fifth stations 108-110). The first station 104 may determine (e.g., measure) a first received signal strength of the first retransmission, a second received signal strength of the second retransmission, and a third received signal strength of the third retransmission. The first station 104 may determine a relative proximity of each station 108-112 to the first station 104 based on RSSIs associated with the retransmitted data packets 120.

In response to a determination that each received signal strength satisfies a second threshold (e.g., is greater than or equal to a second threshold signal strength or has a mid-range RSSI), the first station 104 may suppress retransmission of the data packet 120, as shown in FIG. 1B. For example, for 2-D spaces, the first station 104 may be configured to determine that three mid-range RSSI coverage areas collectively have a sufficiently high probability of including all stations in the one-hop range 160 of the first station 104. In the illustrative embodiment, the first station 104 may be within a triangle formed by the third, fourth, and fifth stations 108-112. Thus, any stations in the one-hop range 160 of the first station 104 would likely receive at least one of the first retransmission from the third station 108, the second retransmission from the fourth station 110, or the third retransmission from the fifth station 112. For example, the seventh and eighth stations 116, 118 may have a high probability of receiving at least one of the first retransmission, the second retransmission, or the third retransmission. An example of three mid-range coverage areas collectively overlapping a coverage area of a station is illustrated in a second embodiment 610 of FIG. 6. For example, a coverage area 614 of the third station 108, a coverage area 616 of the fourth station 110, and a coverage area 618 of the fifth station 112 may collectively overlap the coverage area 602 of the first station 104.

For 3-D spaces, the first station 104 may be configured to determine that four mid-range RSSI coverage areas collectively have a sufficiently high probability of including all stations in the one-hop range 160 of the first station 104. For example, the first station 104 may detect the first retransmission by the third station 108, the second retransmission by the fourth station 110, and the third retransmission by the fifth station 112, and a fourth retransmission by the sixth station 114. The first station 104 may determine (e.g., measure) the first received signal strength of the first retransmission, the second received signal strength of the second retransmission, the third received signal strength of the third retransmission, and a fourth received signal strength of the fourth retransmission. The first station 104 may determine a relative proximity of each station 108-114 to the first station 104 based on RSSIs associated with the retransmitted data packets 120. In the illustrative embodiment, the first station 104 may be within a three-dimensional polygon formed by the third, fourth, fifth, and sixth stations 108-114. Thus, any stations in the one-hop range 160 of the first station 104 would likely receive at least one of the first retransmission from the third station 108, the second retransmission from the fourth station 110, the third retransmission from the fifth station 112, or the fourth retransmission from the sixth station 114.

In response to a determination that the received signal strength of the first retransmission (e.g., the retransmission of the data packet 120 from the third station 108) fails to satisfy the first threshold and each of the first, second, and third retransmissions fail to satisfy the second threshold, the first station 104 may retransmit the data packet 120 to at least one other station in the peer-to-peer infrastructure-less network 102, as shown in FIG. 1A. For example, the first station 104 may rebroadcast the data packet 120 to each station in the one-hop range 160 of the first station 104.

Thus, the first station 104 may reduce overhead of the peer-to-peer infrastructure-less network 102 by suppressing retransmissions of the data packet 120 (e.g., reducing data traffic) when the received signal strength of one or more neighboring station's retransmission of the data packet 120 satisfies a threshold. The scalability of the peer-to-peer infrastructure-less network 102 may improve based on the reduced overhead. For example, additional stations may be added to the peer-to-peer infrastructure-less network 102 and/or additional data packets may be transmitted (e.g., broadcast) in the peer-to-peer infrastructure-less network 102 based on the reduced overhead. Implementing the suppression techniques of the first station 104 into each station 104-118 within the peer-to-peer infrastructure-less network 102 may enable each station 104-118 to be a source station or a traffic station. For example, each station 104-118 may generate a data packet for transmission and/or may retransmit a received data packet to other stations.

Although the system 100 of FIGS. 1A-1B have been described generally with respect to broadcast transmissions, it will be appreciated that the techniques may be applicable to unicast transmission and multicast transmissions. For example, if the mobility of the peer-to-peer infrastructure-less network 102 is relatively high, then the overhead of forming and maintaining routes may increase. Thus, broadcasting a unicast or multicast data packet to the intended recipient(s) may be a relatively efficient means for data transfer. Data packets may employ a hop count and a unicast sender (e.g., the second station 106) may "learn" the number of hops to the destination station based on previous data packets from the destination station.

As a non-limiting example for a unicast, the data packet 120 generated by the second station 106 (e.g., the source station) may indicate a source-destination pair. For example, the data packet 120 may indicate the eighth station 118 as the destination and the second station 106 as the source. The second station 106 may transmit (e.g., broadcast) the data packet 120 in a substantially similar manner as described above. Additionally, the intermediate stations may rebroadcast the data packet 120 according to the techniques described above. For example, the first station 104 may selectively retransmit (e.g., rebroadcast) the data packet 120 to stations in the one-hop range 160 of the first station 104 and/or selectively suppress retransmission of the data packet 120 according to the techniques described above.

When the eighth station 118 receives the data packet 120, the eighth station 118 may send an acknowledgment packet to the one or more stations that forwarded the data packet 120 to the eighth station 118 to indicate receipt of the data packet 120. The acknowledgment packet may be unicasted towards the source station (e.g., the second station 106). Stations along the acknowledgement path (and neighboring stations) to the source station that detect the acknowledgment packet may "become aware of" their role as potential forwarding (e.g., retransmitting) stations based on the source-destination pair. If a station does not detect an acknowledgment for a unicast during a particular time period, the station will not forward future unicasts from the source-destination pair. The particular time period may be selected such that the particular time period is longer than an end-to-end round trip latency of the entire network.

Figure 2:
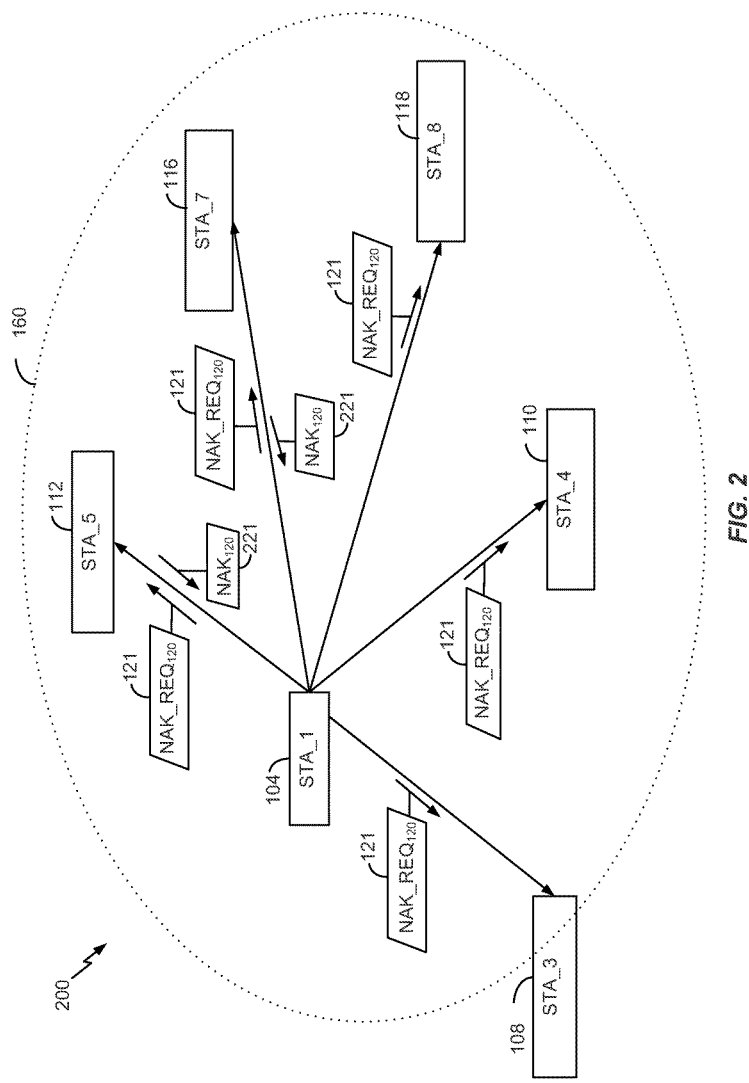
FIG. 2 is a particular embodiment of negative acknowledgment request scheme to enhance content delivery reliability of the system in FIG. 1.

Referring to FIG. 2, a particular embodiment 200 of a negative acknowledgment (NAK) request scheme to enhance content delivery reliability is shown. For example, FIG. 2 illustrates transmitting NAK requests 220 to multiple stations in the one-hop range 160 of the first station 104.

In response to suppressing retransmission of the data packet 120, the first station 104 may transmit a second data packet 121 to each station in the one-hop range 160 of the first station 104. For example, the first station 104 may transmit the second data packet 121 to the third station 108, to the fourth station 110, to the fifth station 112, to the seventh station 116, and to the eighth station 118. The second data packet 121 may include a NAK Request (e.g., NAK_REQ120) to determine whether each station received the data packet 120. Each NAK request may include an indication (e.g., a sequence number, etc.) to uniquely identify one or more data packets that have been suppressed by the first station 104. For example, each NAK request may include a common identifier to identify that the data packet 120 of FIGS. 1A-1B has been suppressed by the first station 104.

In a particular embodiment, the NAK requests may be transmitted to the stations in the one-hop range 160 of the first station 104 when the first station 104 has an opportunity to transmit a data packet. For example, the NAK request may be transmitted when a countdown sequence has completed, as described with respect to FIGS. 1A-1B. The NAK requests may be included in another (e.g., a subsequent) data packet (e.g., the second data packet 121) that is broadcasted to the stations in the one-hop range 160 of the first station 104. Alternatively, the NAK requests may correspond to a data packet that is broadcasted to the stations in the one-hop range 160 of the first station 104.

In another particular embodiment, the first station 104 may proactively send the NAK requests to the stations in the one-hop range 160 of the first station 104 after a particular time period if the first station 104 has not had an opportunity to rebroadcast within the particular time period. As a non-limiting example, the first station 104 may proactively send the NAK requests to the stations in the one-hop range 160 of the first station 104 after 10 microseconds (µs) of receiving the data packet 120 from the second station 106 if the first station 104 does not have an opportunity to rebroadcast within the 10 µs.

If a particular station did not receive the data packet 120 from the original transmission (from the second station 106) or a retransmission (e.g., the rebroadcast from the third station 108 in FIG. 1B), the particular station may transmit a NAK to the first station 104 in response to receiving the NAK request. Alternatively, if the particular station did receive the data packet 120, the particular station may "ignore" the NAK request. In the illustrated embodiment, the fifth station 112 and the seventh station 116 may send a NAK 221 (e.g., NAK120) to the first station 104 in response to receiving the NAK request (e.g., NAK_REQ120) to indicate that the fifth station 112 and the seventh station 116 did not receive the data packet 120.

In response to receiving the NAK 221 from the fifth station 112 and the seventh station 116, the first station 104 may retransmit the data packet 120. In a particular embodiment, the first station 104 may rebroadcast the data packet 120 (e.g., transmit the data packet 120 to each station in the one-hop range 160 of the first station 104). For example, to ensure that each station in the one-hop range 160 of the first station 104 has received the data packet 120, the first station 104 may rebroadcast the data packet 120 if one station in the one-hop range 160 of the first station 104 transmits a NAK 230. In another particular embodiment, the first station 104 may transmit the data packet 120 to the fifth station 112 and the seventh station 116 via unicast (or multicast) transmission in response to receiving the NAK 221 from the fifth station 112 and the seventh station 116. For example, the data packet 120 may be multicast to a subset of stations. Transmitting the data packet 120 to the fifth station 112 and the seventh station 116 via unicast transmission may reduce overhead (e.g., reduce traffic) as compared to broadcasting the data packet 120 to all stations, including those that have not indicated a need for the data packet 120.

In certain embodiments, the first station 104 may perform frame aggregation for multiple missed data packets. As a non-limiting example, the first station 104 may suppress the data packet 120 and a second data packet 121. A subsequent NAK request may include indications that identify the data packet 120 and the second data packet 121. A NAK from the seventh station 116 may indicate that seventh station 116 has not received either the data packet 120 or the second data packet 121. In response to receiving the NAK, the first station 104 may aggregate the data packet 120 and the second data packet 121, and may transmit the aggregated data packet to the seventh station 116. Aggregating the data packet 120 and the second data packet 121 may reduce overhead (e.g., traffic). For example, the data packet 120 and the second data packet 121 may be provided to the seventh station 116 via a single transmission as opposed to multiple transmissions.

Over a period of time, the first station 104 may dynamically adjust suppression criteria based on a frequency of NAKs received. For example, the first station 104 may collect state information corresponding to the number of NAKs received for each suppression criterion. If the first station 104 determines that a relatively large number of stations are transmitting NAKs when the first station 104 suppresses data packets based on a particular criterion, the first station 104 may discontinue suppression based on the particular criterion. As an illustrative example, if the first station 104 receives a relatively large number of NAKs when data packets are suppressed because the received signal strength of the first retransmission (from the third station 108) satisfies the first threshold, the first station 104 may discontinue suppressing data packets based on the received signal strength of the first retransmission, or may adjust the first threshold. As another example, if the first station 104 receives a relatively large number of NAKs when data packets are suppressed because each of the first, second, and third retransmissions have signal strengths that satisfy the second threshold, the first station 104 may discontinue suppressing data packets based on the received signal strengths of the first, second, and third retransmissions, or may adjusted the second threshold.

The embodiment 200 of FIG. 2 may enhance content delivery reliability of the system 100 of FIGS. 1A-1B. For example, when the first station 104 suppresses the data packet 120, the first station 104 may send NAK requests (e.g., NAK_REQ120) to stations within range to verify whether each station within range has received the data packet 120 from another source. If an in-range station indicates that it has not received the data packet 120, the first station 104 may transmit the data packet 120 to the in-range station.

Figure 3:
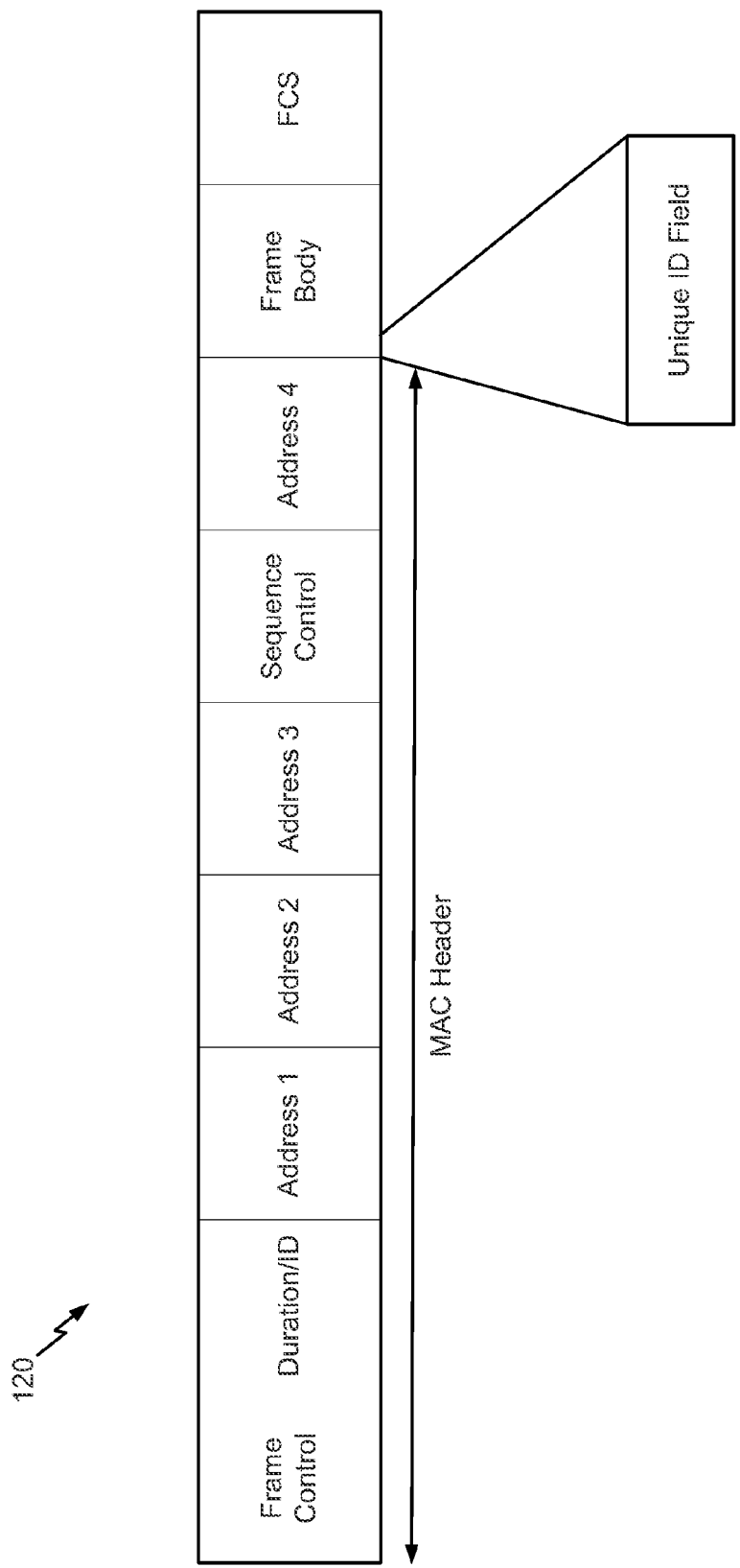
FIG. 3 is a particular embodiment of a data packet communicated in the system of FIG. 1.

Referring to FIG. 3, a particular embodiment of the data packet 120 is shown. The data packet 120 includes a medium access control (MAC) header, a frame body field, and a frame check sequence (FCS) field. The MAC header includes a frame control field, a duration/identification (ID) field, a first address field (Address 1), a second address field (Address 2), a third address field (Address 3), a sequence control field, and a fourth address field (Address 4).

The frame control field includes control information that indicates a type of IEEE 802.11 MAC frame and that provides information used to process the MAC frame. The duration/ID field may indicate a remaining duration of time to receive the next frame transmission.

The first address field may include information that identifies a basic service set (BSS). For example, the first address field includes a BSS identifier. When the data packet 120 is from a station in an independent BSS, the BSS identifier corresponds to a randomly generated, locally administered MAC address of the station that initiated the independent BSS. The second address field may indicate a MAC address of a final destination device to receive the data packet 120. For example, in a broadcast scenario, the second address field may include the MAC address of each station in FIGS. 1A-1B. Alternatively, in a unicast scenario, the second address field may include the MAC address of one station in FIGS. 1A-1B. In a multicast scenario, the second address field may include the MAC address of a subset of the stations in FIGS. 1A-1B.

The third address field may indicate a MAC address of an original source device that created and transmitted the data packet 120. For example, the third address field may include the MAC address of the second station 106 of FIGS. 1A-1B. The sequence control field may include a sequence number and a fragment number. In a multi-frame transmission, each frame has a different sequence number. If fragmentation is used, individual frames can be split into multiple fragments, and each fragment may have a different fragment number. Sequence numbers and fragment numbers are used at a receiver device to reconstruct the original message. The fourth address field may indicate a MAC address of the station that transmitted the data packet 120 onto the wireless medium. For example, if the first station 104 retransmitted the data packet 120, the fourth address field would indicate the MAC address of the first station 104.

The frame body field includes a unique identification (ID) field and data (e.g., information) included in management type frames or data type frames. The unique ID field is added after the MAC header and before a data payload portion of the data packet 120. For example, the data packet 120 is tagged with a unique identification (e.g., a unit identifier having a bit sequence that is approximately four to eight bytes) that identifies the data packet 120. In a particular aspect, a unique identification field may include a bit sequence that has at least four bytes. Thus, in response to receiving the data packet 120, each station 104-118 may compare the third address field (e.g., the sender address) and the unique identification to identify whether the data packet 120 is a "new" data packet or a previously received data packet located in a queue that is waiting for suppression or retransmission.

The FCS field is added to the data packet 120 as a checksum for error detection. For example, the FCS filed may include a FCS number that is calculated by a source node (e.g., the second station 106 of FIGS. 1A-1B) based on the data in the data packet 120. When a destination node (e.g., the first station 104 of FIGS. 1A-1B) receives the data packet 120, the destination node recalculates the FCS number and compares the recalculated FCS number with the FCS number included in the data packet 120. If the two FCS numbers are different, the destination node determines that an error occurred and discards the data packet 120. The destination node may also notify a transmitting node of the error.

It will be appreciated that the unique ID field of FIG. 3 may enable stations to quickly identify the data packet 120 without comparing every bit in each frame, which would lead to relatively large processing overhead. For example, upon receiving at least one of the first retransmission, the second retransmission, or the third retransmission, the first station 104 may quickly identify the data packet 120 by comparing the third address field (indicating the second station 106 as the original sender) and the unique ID field.

Figure 4:
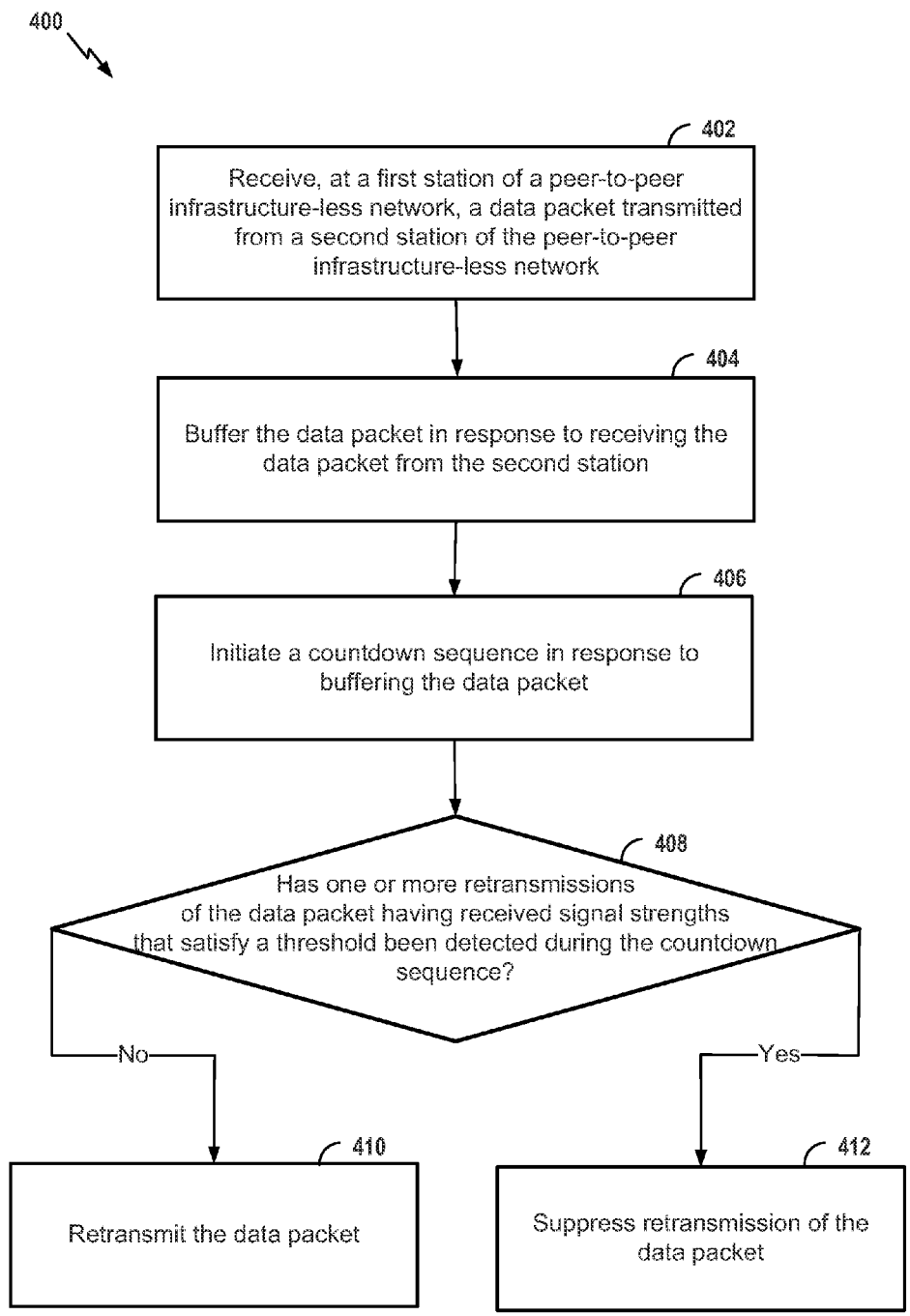
FIG. 4 is a flow diagram of an illustrative method for enabling a route-less multi-hop transmission technique in a peer-to-peer infrastructure-less network.

Referring to FIG. 4, a particular embodiment of a method 400 for enabling a route-less multi-hop transmission technique in a peer-to-peer infrastructure-less network is described. The method 400 may be performed at any of the stations 104-118, and the peer-to-peer infrastructure-less network may include or correspond to the peer-to-peer infrastructure-less network 102 of FIGS. 1A-1B.

The method 400 may include receiving, at a first station of a peer-to-peer infrastructure-less network, a data packet transmitted from a second station of the peer-to-peer infrastructure-less network, at 402. For example, referring to FIGS. 1A-1B, the first station 104 may receive the data packet 120 from the second station 106. The data packet 120 may be transmitted to the first station 104 via a broadcast transmission, a multicast transmission, or a unicast transmission.

The data packet may be buffered, at 404. For example, referring to FIGS. 1A-1B, in response to receiving the data packet 120 from the second station 106, the first station 104 may buffer the data packet 120. A countdown sequence may be initiated in response to buffering the data packet, at 406. For example, referring to FIGS. 1A-1B, after buffering the data packet 120, the first station 104 may initiate a countdown sequence from the particular number.

At 408, the first station may determine whether one or more retransmissions of the data packet having received signal strength(s) that satisfy a threshold have been detected during the countdown sequence. For example, referring to FIG. 1B, the first station 104 may detect the first retransmission of the data packet 120 from the third station 108 and may determine (e.g., measure) the received signal strength of the first retransmission. In response to a determination that the received signal strength of the first retransmission satisfies the first threshold (e.g., is greater than or equal to the first threshold signal strength or has a relatively high RSSI), the first station 104 may suppress retransmission of the data packet 120, at 412.

Additionally, or in the alternative, the first station 104 may detect the first retransmission, the second retransmission, and the third retransmission (e.g., may receive a retransmitted data packet 120 from the third, fourth, and fifth stations 108-110). The first station 104 may determine (e.g., measure) a first received signal strength of the first retransmission, determine a second received signal strength of the second retransmission, and determine a third received signal strength of the third retransmission. In response to a determination that each received signal strength satisfies the second threshold (e.g., is greater than or equal to the second threshold signal strength or has a mid-range RSSI), the first station 104 may suppress retransmission of the data packet 120, at 412.

With reference to FIG. 1A, in response to a determination that at least one retransmitted data packet 120 having a received signal strength that satisfies the first threshold has not been detected during the countdown sequence, and in response to a determination that three or more retransmitted data packets 120 having received signal strengths that satisfy the second threshold have not been detected during the countdown sequence, the first station 104 may retransmit the data packet 120, at 410.

In a particular embodiment, the method 400 may include a negative acknowledgment based approach to improve content delivery reliability. For example, the method 400 may include transmitting a negative acknowledgement request to at least one other station in the peer-to-peer infrastructure-less network to determine whether the at least one other station received the data packet in response to suppressing retransmission of the data packet. Referring to FIG. 2, the first station 104 may transmit a NAK request (e.g., NAK_REQ120) to each station in the one-hop range 160 of the first station 104 to determine whether each station received the data packet 120 in response to suppressing retransmission of the data packet 120.

If a particular station did not receive the data packet 120 from the original transmission (from the second station 106) or a retransmission, the particular station may transmit a NAK to the first station 104 in response to receiving the NAK request. Alternatively, if the particular station did receive the data packet 120, the particular station may "ignore" the NAK request 220. For example, the seventh station 116 may send the NAK 221 (e.g., NAK120) to the first station 104 in response to receiving the NAK request to indicate that the eighth station 118 did not receive the data packet 120.

In response to receiving the NAK 221 from the seventh station 116, the first station 104 may retransmit the data packet 120. In a particular embodiment, the first station 104 may rebroadcast the data packet 120 (e.g., transmit the data packet 120 to each station in the one-hop range 160 of the first station 104). For example, to ensure that each station in the one-hop range 160 of the first station 104 has received the data packet 120, the first station 104 may rebroadcast the data packet 120 if one station in the one-hop range 160 of the first station 104 transmits a NAK 221. In another particular embodiment, the first station 104 may transmit the data packet 120 to the seventh station 116 via unicast transmission in response to receiving the NAK 221 from the seventh station 116. Transmitting the data packet 120 to the seventh station 116 via unicast transmission may reduce overhead (e.g., reduce traffic) as compared to transmitting the data packet 120 to stations that have not indicated a need for the data packet 120.

The method 400 of FIG. 4 may reduce overhead of the peer-to-peer infrastructure-less network 102 by suppressing retransmissions of the data packet 120 (e.g., reducing data traffic) when the received signal strength of one or more neighboring station's retransmission of the data packet 120 satisfies a threshold. In addition, the negative acknowledgment based approach may enhance content delivery reliability. For example, when the first station 104 suppresses the data packet 120, the first station 104 may send NAK requests to stations within range to verify whether each station within range of the first station 104 has received the data packet 120 from another source. If an in-range station indicates that it has not received the data packet 120, the first station 104 may transmit the data packet 120 to the in-range station.

Figure 5:
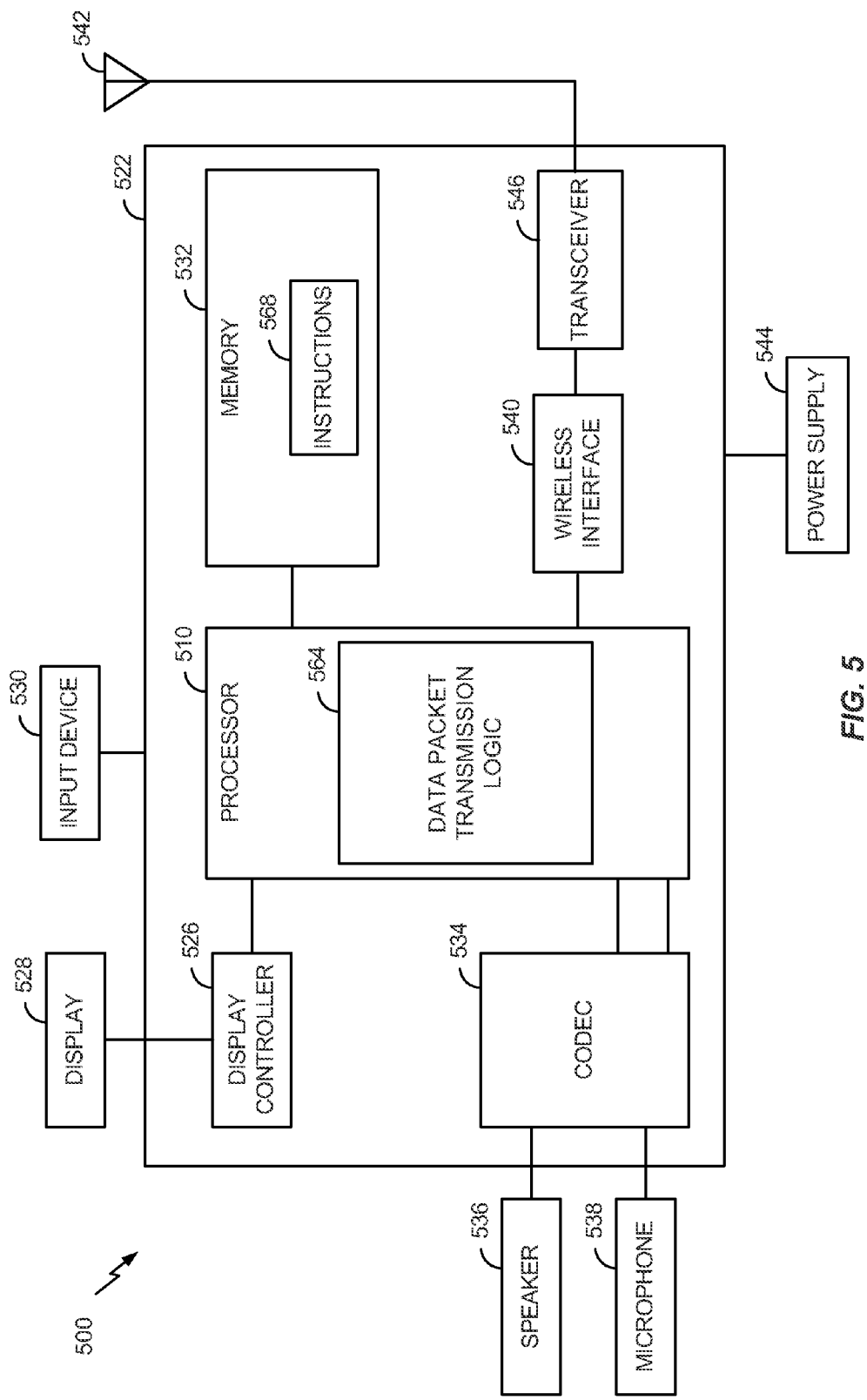
FIG. 5 is a diagram of a wireless device that is operable to support various embodiments of one or more methods, systems, apparatuses, and/or computer-readable media disclosed herein.

Referring to FIG. 5, a particular illustrative embodiment of a wireless communication device is depicted and generally designated 500. The device 500 includes a processor 510, such as a digital signal processor, coupled to a memory 532. In an illustrative embodiment, the device 500, or components thereof, may correspond to the stations 104-118 of FIGS. 1-2, or components thereof.

The processor 510 may be configured to execute software (e.g., a program of one or more instructions 568) stored in the memory 532. Additionally or alternatively, the processor 510 may be configured to implement one or more instructions stored in a memory of a wireless interface 540 (e.g., an IEEE 802.11 interface). For example, the wireless interface 540 may be configured to operate in accordance with the IEEE 802.11s standard. In a particular embodiment, the processor 510 may be configured to operate in accordance with the method 400 of FIG. 4. For example, the processor 510 may include data packet transmission logic 564 to execute the method 400 of FIG. 4.

The wireless interface 540 may be coupled to the processor 510 and to an antenna 542. For example, the wireless interface 540 may be coupled to the antenna 542 via a transceiver 546, such that wireless data received via the antenna 542 and may be provided to the processor 510.

A coder/decoder (CODEC) 534 can also be coupled to the processor 510. A speaker 536 and a microphone 538 can be coupled to the CODEC 534. A display controller 526 can be coupled to the processor 510 and to a display device 528. In a particular embodiment, the processor 510, the display controller 526, the memory 532, the CODEC 534, and the wireless interface 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display device 528, the input device 530, the speaker 536, the microphone 538, the antenna 542, and the power supply 544 are external to the system-on-chip device 522. However, each of the display device 528, the input device 530, the speaker 536, the microphone 538, the antenna 542, and the power supply 544 can be coupled to one or more components of the system-on-chip device 522, such as one or more interfaces or controllers.

In conjunction with the described embodiments, an apparatus includes means for receiving a data packet transmitted from a station of a peer-to-peer infrastructure-less network. For example, the means for receiving may include the stations 104-118 of FIGS. 1-2, the wireless interface 540, the processor 510 programmed to execute the instructions 568, the data packet transmission logic 564 of FIG. 5, one or more other devices, circuits, modules, or instructions to receive the data packet, or any combination thereof.

The apparatus also includes means for determining whether to retransmit the data packet to at least one other station in a peer-to-peer infrastructure-less network or whether to suppress retransmission of the data packet. For example, the means for determining may include the stations 104-118 of FIGS. 1-2, the wireless interface 540, the processor 510 programmed to execute the instructions 568, the data packet transmission logic 564 of FIG. 5, one or more other devices, circuits, modules, or instructions to determine whether to retransmit the data packet or whether to suppress retransmission of the data packet, or any combination thereof.

Those of skill in the art would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving, at a first station of a peer-to-peer infrastructure-less network, a data packet transmitted from a second station of the peer-to-peer infrastructure-less network, the data packet addressed to multiple stations of the peer-to-peer infrastructure-less network; and
retransmitting, by the first station, the data packet to a third station of the peer-to-peer infrastructure-less network;
wherein a determination of whether to retransmit the data packet from the third station to at least one other station in the peer-to-peer infrastructure-less network or whether to suppress retransmission of the data packet is based on a signal strength of a retransmitted version of the data packet, wherein the data packet is transmitted by the third station to the at least one other station in response to determining that the signal strength fails to satisfy a threshold;
wherein retransmission of the data packet is suppressed in response to determining that the signal strength satisfies the threshold; and
wherein, in response to suppressing retransmission of the data packet:
a negative acknowledgement request is transmitted to the at least one other station to determine whether the at least one other station received the data packet;
a negative acknowledgement is received from the at least one other station;
the data packet is aggregated with at least one other data packet not received by the at least one other station to generate an aggregated data packet, wherein the at least one other data packet is determined by a second negative acknowledgement from the at least one other station; and
the aggregated data packet is transmitted to the at least one other station.

2. The method of claim 1, wherein the peer-to-peer infrastructure-less network is a wireless mesh network.

3. The method of claim 1, wherein the peer-to-peer infrastructure-less network is a neighborhood awareness networking (NAN) data link network.

4. The method of claim 1, further comprising:
buffering the data packet in response to receiving the data packet from the second station; and
initiating a countdown sequence in response to buffering the data packet;
wherein the determination of whether to retransmit the data packet or whether to suppress retransmission of the data packet is performed after the countdown sequence is completed.

5. The method of claim 1, wherein the data packet is broadcasted to each station in the peer-to-peer infrastructure-less network from the second station, wherein the data packet is multicast to a subset of stations in the peer-to-peer infrastructure-less network from the second station, or wherein the data packet is unicast to a particular station in the peer-to-peer infrastructure-less network from the second station.

6. The method of claim 1, wherein a frame body field of the data packet includes a unique identification field having a bit sequence that identifies the data packet.

7. The method of claim 6, wherein the bit sequence has at least four bytes.

8. An apparatus comprising:
a processor; and
a memory coupled to the processor, wherein the memory stores instructions that are executable by the processor to perform operations comprising:
receiving, at a first station of a peer-to-peer infrastructure-less network, a data packet transmitted from a second station of the peer-to-peer infrastructure-less network; and
initiating, by the first station, retransmission of the data packet to a third station of the peer-to-peer infrastructure-less network;
wherein a determination of whether to retransmit the data packet from the third station to at least one other station in the peer-to-peer infrastructure-less network or whether to suppress retransmission of the data packet is based on a signal strength of a retransmitted version of the data packet, wherein the data packet is transmitted by the third station to the at least one other station in response to determining that the signal strength fails to satisfy a threshold;
wherein retransmission of the data packet is suppressed in response to determining that the signal strength satisfies the threshold; and
wherein, in response to suppressing retransmission of the data packet:
a negative acknowledgement request is transmitted to the at least one other station to determine whether the at least one other station received the data packet;
a negative acknowledgement is received from the at least one other station;
the data packet is aggregated with at least one other data packet not received by the at least one other station to generate an aggregated data packet, wherein the at least one other data packet is determined by a second negative acknowledgement from the at least one other station; and
the aggregated data packet is transmitted to the at least one other station.

9. The apparatus of claim 8, wherein the peer-to-peer infrastructure-less network is a wireless mesh network or a neighborhood awareness networking (NAN) data link network.

10. The apparatus of claim 8, wherein the operations further comprise:
buffering the data packet in response to receiving the data packet from the second station; and
initiating a countdown sequence in response to buffering the data packet;
wherein the determination of whether to retransmit the data packet or whether to suppress retransmission of the data packet is after the countdown sequence is completed.

11. A non-transitory computer-readable medium comprising instructions that, when executed by a processor, cause the processor to perform operations comprising:
receiving, at a first station of a peer-to-peer infrastructure-less network, a data packet transmitted from a second station of the peer-to-peer infrastructure-less network; and
initiating, by the first station, retransmission of the data packet to a third station of the peer-to-peer infrastructure-less network;
wherein a determination of whether to retransmit the data packet from the third station to at least one other station in the peer-to-peer infrastructure-less network or whether to suppress retransmission of the data packet is based on a signal strength of a retransmitted version of the data packet, wherein the data packet is transmitted by the third station to the at least one other station in response to determining that the signal strength fails to satisfy a threshold;
wherein retransmission of the data packet is suppressed in response to determining that the signal strength satisfies the threshold; and
wherein, in response to suppressing retransmission of the data packet:
a negative acknowledgement request is transmitted to the at least one other station to determine whether the at least one other station received the data packet;
a negative acknowledgement is received from the at least one other station;
the data packet is aggregated with at least one other data packet not received by the at least one other station to generate an aggregated data packet, wherein the at least one other data packet is determined by a second negative acknowledgement from the at least one other station; and
the aggregated data packet is transmitted to the at least one other station.

12. The non-transitory computer-readable medium of claim 11, wherein the peer-to-peer infrastructure-less network is a wireless mesh network or a neighborhood awareness networking (NAN) data link network.

13. An apparatus comprising:
means for receiving a data packet transmitted from a station of a peer-to-peer infrastructure-less network; and
mean for retransmitting, by the first station, the data packet to a third station of the peer-to-peer infrastructure-less network;
wherein a determination of whether to retransmit the data packet from the third station to at least one other station in a peer-to-peer infrastructure-less network or whether to suppress retransmission of the data packet is based on a signal strength of a retransmitted version of the data packet, wherein the data packet is transmitted by the third station to the at least one other station in response to determining that the signal strength fails to satisfy a threshold;
wherein retransmission of the data packet is suppressed in response to determining that the signal strength satisfies the threshold; and
wherein, in response to suppressing retransmission of the data packet:
a negative acknowledgement request is transmitted to the at least one other station to determine whether the at least one other station received the data packet;
a negative acknowledgement is received from the at least one other station;
the data packet is aggregated with at least one other data packet not received by the at least one other station to generate an aggregated data packet, wherein the at least one other data packet is determined by a second negative acknowledgement from the at least one other station; and
the aggregated data packet is transmitted to the at least one other station.

14. The apparatus of claim 13, wherein the peer-to-peer infrastructure-less network is a wireless mesh network or a neighborhood awareness networking (NAN) data link network.

* * * * *